May 25, 1926.

B. W. KENDALL

REPEATER CIRCUITS

Filed Dec. 2, 1920

1,585,866

Inventor:
Burton W. Kendall.
by W. E. Beatty, Atty.

Patented May 25, 1926.

1,585,866

UNITED STATES PATENT OFFICE.

BURTON W. KENDALL, OF NEW YORK, N. Y., ASSIGNOR TO WESTERN ELECTRIC COMPANY, INCORPORATED, OF NEW YORK, N. Y., A CORPORATION OF NEW YORK.

REPEATER CIRCUITS.

Application filed December 2, 1920. Serial No. 427,869.

This invention relates to vacuum tube repeater circuits and more particularly it relates to arrangements for supplying direct current potentials for the input circuits of a plurality of vacuum tube repeaters.

When vacuum tubes are employed as amplifiers and as telephone repeaters, the grid or control electrode of each tube is usually maintained at a negative potential with respect to the cathode, as it has been found that the tubes will operate more satisfactorily under such conditions.

An object of this invention is to provide the proper potentials for the control electrodes of a plurality of tubes from a common source of potential without producing any undesired reactions between the tubes. This common source is preferably a battery, which is distinct from the sources of current for the other circuits associated with the repeater tubes. The specific means, hereinafter described in detail, employed for preventing the production of undesired disturbances in the potential of one grid by potential variations from another vacuum tube circuit through the intermediary of the connections to the common source above mentioned, comprises a high inductance and a condenser, placed in each input circuit in such a manner that the inductance tends to choke out and the condenser to short-circuit the undesired disturbances whereby the absence of cross-talk or other undesired reactions between the tubes is insured.

Figure 1:
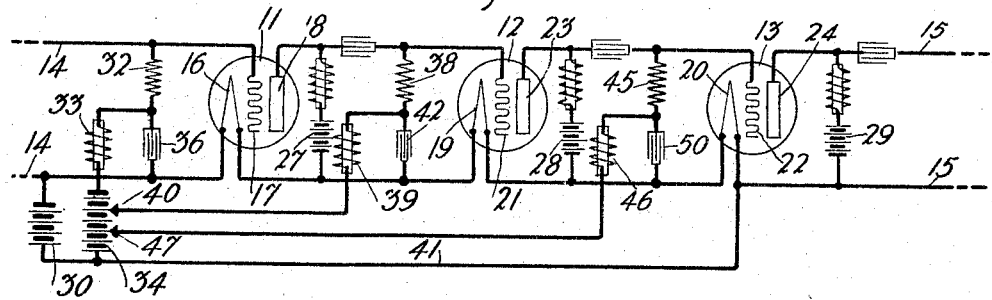
Figure 2:
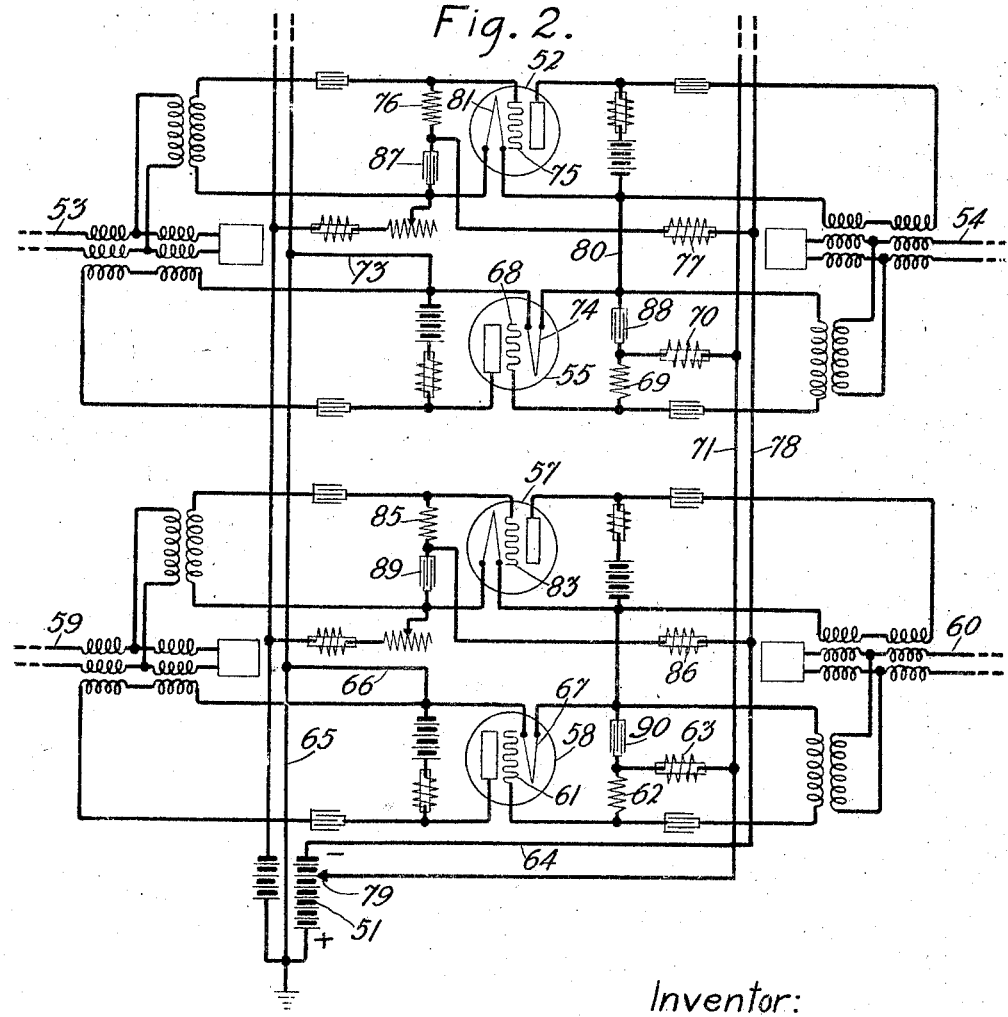

This invention will be better understood by reference to the following detailed description taken in connection with the accompanying drawings in which Figure 1 represents this invention embodied in a multistage amplifier circuit of the one-way transmission type, while Figure 2 represents this invention as applied to two-way repeater systems.

Referring to Figure 1, a multi-stage amplifier set comprising three vacuum tube repeaters 11, 12 and 13 is shown with the three tubes connected in tandem between an incoming line 14—14 and an outgoing line 15—15. Tube 11 consists of a cathode 16, a control electrode 17 and an anode 18. The corresponding electrodes for tubes 12 and 13 are numbered 19, 20, 21, 22, 23 and 24 respectively. Batteries 27, 28 and 29 are shown connected in the usual way for supplying space current to the output circuit electrodes of the three tubes. The three cathodes 16, 19 and 20 are connected in series with a common heating source comprising battery 30. Negative potential for grid 17 of tube 11 is obtained by circuit connections going from grid 17 through the usual high resistance grid leak 32, choke coil 33, battery 34 and battery 30 to the cathode, battery 34 being so poled and of such a value to make the grid negative with respect to the cathode. Condenser 36 is connected effectively in shunt to batteries 30 and 34 and choke coil 33 so as to offer a substantial short-circuit for fluctuation in the current through the battery 34 and choke coil 33.

Negative potential for grid 21 is obtained by a connection through high resistance 38, choke coil 39, that portion of battery 34 between tap 40 and its most positive terminal, through conductor 41 and filament 20 to cathode 19. Condenser 42 is shown connected effectively in shunt to that portion of battery 34 serving to supply negative potential for grid 21, whereby fluctuations in the potential of the battery are substantially short-circuited.

In a similar manner the negative potential for grid 22 of tube 13 is obtained by a connection through high resistance leak 45, choke coil 46 to a tap 47 on battery 34.

The manner in which the choke coils and short-circuiting condensers serve to prevent undesired reactions between the tubes having a common source of negative potential for the grids may now be explained as follows:

Incoming currents from line 14 will be amplified by amplifier 11 and the amplified potential variations will be impressed across the terminals of resistance 38 and condenser 42 upon the input electrodes of amplifier 12. These variations are chiefly voltage variations in most instances. Any current variations present however would, if special precautions were not taken, produce an IR drop in that portion of battery 34 included between tap 40 and the positive end of the battery and in filaments 20 and 19. This IR drop in battery 34 and filaments 20 and 19 would change the potential of grid 17 with respect to filament 16 thereby producing a reaction between the output-input circuit of tubes 11 and 12 and the input circuit of tube 11. In certain cases this feed back of energy would be in phase with the original incoming signals whereby singing would be produced. This feed back, of course, is highly undesirable regardless of whether it is in phase with the original currents. In accordance with this invention condenser 42 is placed effectively in shunt to that portion of battery 34 and cathode 20 connected in the grid-cathode circuit of tube 12 so that current variations through resistance 38 tend to be short-circuited through condenser 42 instead of passing through battery 34 and producing an equivalent IR drop therein. The short-circuiting action of condenser 42 is aided by the choking action of inductance coil 39 which is in series with battery 34 in the grid-cathode circuit of tube 12. Even if condenser 42 and choke coil 39 would allow a fluctuating current to be fed back through battery 34, choke coil 33 which is included in series with battery 34 in the input circuit of tube 11 would tend to produce a further choking of the undesired fluctuations and condenser 36 would, in addition, aid in short-circuiting these undesired fluctuations. In a similar manner condenser 50 and choke coil 46 individual to tube 13 aid in the preventing of fluctuations in the output-input circuit of tubes 12 and 13 being fed back from the common battery 34 into the input circuits of either tubes 11 or 12.

It follows that the above described arrangement of inductances and capacities individual to each repeater tube serves to insure that a common grid battery may be employed for a multi-stage amplifier set without danger of undesired feed back reactions being present.

Figure 2 illustrates how a common grid battery 51 may be employed for furnishing negative potential for the grids of 2 two-way repeater circuits. Vacuum tube 52 is shown as connected in the usual repeater circuit arrangement for repeating from line section 53 to line section 54 while vacuum tube 55 is shown arranged to repeat signals from line section 54 to line section 53. Vacuum tubes 52 and 55 are shown connected in the usual way for obtaining two-way repeater operation and a detailed description thereof is not believed necessary.

Figure 2 also shows two vacuum tubes 57 and 58 connected up in a two-way repeater circuit for repeating signals between line sections 59 and 60.

The circuit connections for obtaining negative grid potential for grid 61 of tube 58 may be traced from grid 61 through grid leak 62, choke coil 63, tap 79, battery 51, conductors 65 and 66 to cathode 67. Negative potential for grid 68 of tube 55 is obtained by connections from grid 68 through grid leak 69, choke coil 70, conductor 71, tap 79, battery 51, conductors 65, 73 to cathode 74. Negative grid potential for grid 75 of tube 52 is obtained by a connection through grid leak 76, choke coil 77, conductors 78 and 64, battery 51, conductors 65, 73, cathode 74 and conductor 80 to cathode 81. Negative potential for grid 83 of tube 57 is obtained by a connection to lead 64 which is obtained through grid leak 85 and choke coil 86. Condenser, 87, 88, 89 and 90 are connected in the input circuits of tubes 52, 55, 57 and 58 in a manner similar to the condensers of Figure 1 in order to effectively short-circuit, for alternating currents, that portion of the common battery 51 which is included in the respective input circuits of the tubes.

The manner in which these condensers and the associated choke coils in the leads to the common battery prevent undesired reactions between the repeater circuits may be explained as follows:

Incoming currents which are to be impressed on tube 52 cause current variations through grid leak 76. These current variations are prevented from creating an effective IR drop in battery 51 since condenser 87 tends to short-circuit them and choke coil 77 tends to choke them out. Even if current fluctuations from the input circuit of tube 52 caused appreciable fluctuations in the IR drop through battery 51, such fluctuations would be prevented from producing undesired variations in the potential of grid 68 of tube 55 by the series choke coil 70 and the shunting condenser 88. In the same manner fluctuations in the IR drop of battery 51 which tends to form through current variations in the input circuit of tube 52 would be prevented from affecting the grid potentials of tubes 57 and 58 by the respective condensers and choke coils associated therewith as above described. It follows therefore that by means of the circuit arrangement above described a common source of negative potential for the grids of tubes in two-way repeater circuits may be employed without any danger whatsoever of cross-talk or other undesired reactions being produced thereby.

It is to be understood of course that the values of these inductances and condensers should depend upon the conditions of each particular case to a certain extent and would depend chiefly on the frequency of the fluctuations to be suppressed as well as their intensity. In general it may be said that the choking inductances will be found satisfactory if they are given a value in the neighborhood of 20 to 25 henrys, while a satisfactory short-circuiting of the fluctuations will be produced with the condensers if they are given a value of 1 microfarad or more.

It is to be understood that the circuit arrangements above described in connection with a battery for supplying negative potential to the control electrodes of vacuum tubes is also useful in suppressing undesired reactions due to a common battery in other vacuum tubes circuits than the grid-cathode circuit. It is also to be understood that this invention is applicable to systems employing repeaters of types other than the types specifically described above.

What is claimed is:

1. In combination, a plurality of vacuum tubes, each having a control electrode, a cathode and an anode, a battery having terminals of different values of negative potential with respect to said cathodes, a connection from one of said terminals to one of said control electrodes, a connection from another of said terminals to a second of said control electrodes, and means for preventing undesired fluctuations in potential from being fed through the connections for one tube to said common battery into the input circuit of another of said tubes.

2. In combination, a plurality of vacuum tube repeaters, each having an anode, a cathode and a control electrode, a battery having a plurality of terminals of different values of negative potential with respect to said cathodes, a connection from one of said terminals to one of said control electrodes, a connection from another of said terminals to another of said electrodes, translating devices individual to each of said tubes for impressing on each of said tubes the currents to be repeated, and means for preventing undesired potential fluctuations from being impressed through the connections for one tube to said common battery upon the input circuit of another of said tubes.

3. In combination, a plurality of vacuum tube repeaters, each having an anode, a cathode and a control electrode, a battery having a plurality of terminals of different values of negative potential with respect to said cathodes, a connection from one of said terminals to one of said control electrodes, a connection from another of said terminals to a second of said control electrodes, and an inductance included in each of said connections for preventing undesired potential fluctuations from being impressed through the connections for one tube to said common battery upon the input circuit of another of said tubes.

4. In combination a plurality of vacuum tube repeaters each having an anode, a cathode and a control electrode, a battery having terminals of negative potential with respect to said cathodes, a connection through each of said terminals to one of said control electrodes, separate capacities, one individual to each of said tubes, each of said capacities being connected effectively in shunt to a portion of said battery for preventing undesired potential variations from being impressed through a connection for one tube to said common battery upon the input circuit of another of the said tubes.

5. In combination a plurality of vacuum tube repeaters each having an anode, a cathode and a control electrode, a battery having terminals of negative potential with respect to said cathodes, a connection from each of said terminals to one of said control electrodes, a choke coil in series with each of said connections, and separate capacity elements, one individual to each of said tubes, each of said capacity elements being connected in shunt to that portion of said battery included in the input circuit of its respective tube.

6. In combination, a plurality of vacuum tube repeaters, each having an anode, a cathode and a control electrode, a battery having a plurality of terminals of different potentials with respect to said cathodes, connections from each of said terminals to an electrode of one of said tubes, an inductance in series with each of said leads and separate capacities, one individual to each of said tubes, each of said capacities being connected effectively in shunt to a portion of said battery.

7. In combination, a plurality of repeater elements, each having input terminals and output terminals, a battery having a plurality of terminals of negative potential with respect to said input terminals, a connection from each of said battery terminals to an input terminal of one of said repeaters, an inductance in each of said connections, and separate capacities, one individual to each of said repeater elements, each of said capacities being connected effectively in shunt to a portion of said battery.

8. In combination, a plurality of repeater elements having input and output terminals, a source of potential having a plurality of terminals of different potentials with respect to one of each set of said terminals, a connection from each of said terminals of said source to an input terminal of one of said repeater elements, an inductance in series with each of said connections, and separate capacities, each individual to one of said repeater elements, each of said capacities being connected effectively in shunt to a portion of said source.

9. In an electrical system, a two-way repeating system comprising a vacuum tube for repeating in one direction, a second vacuum tube for repeating in the opposite direction, each of said tubes comprising an anode, a cathode and a control electrode, a battery having a plurality of terminals of negative potential with respect to said cathodes, a connection from each of said terminals to one of said control electrodes, and means comprising an inductance in series with each of said leads and a capacity effectively in shunt to said battery for preventing crosstalk between said tubes.

10. In combination, a plurality of electric space discharge devices, each having an anode, a filamentary cathode and a control electrode for controlling the discharge between the anode and the cathode, and all of said cathodes being connected in series, a source for supplying steady potential difference between said cathodes and said control electrodes, an input circuit for each of said discharge devices, each of said input circuits including a portion of said source and in series with said portion an impedance, means for developing in said impedances varying electromotive forces for application between the control electrodes and the cathodes of the discharge devices, inductances, one connected between one end of each of said impedances and said source, and condensers, one connected directly between said end of each of said impedances and the cathode of the discharge device in the input circuit of which that impedance is connected, said condensers forming paths of low impedance for currents of frequencies to be transmitted through said discharge devices.

In witness whereof, I hereunto subscribe my name this 26th day of November A. D., 1920.

BURTON W. KENDALL.